(12) United States Patent
Ohba

(10) Patent No.: US 8,320,005 B2
(45) Date of Patent: Nov. 27, 2012

(54) IMAGE PROCESSING SYSTEM, IMAGE PROCESSING METHOD, IMAGE PROCESSING APPARATUS, INFORMATION PROCESSING APPARATUS AND RECORDING MEDIUM

(75) Inventor: Shin Ohba, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 386 days.

(21) Appl. No.: 12/622,059

(22) Filed: Nov. 19, 2009

(65) Prior Publication Data

US 2010/0123934 A1    May 20, 2010

(30) Foreign Application Priority Data

Nov. 19, 2008   (JP) .................................. 2008-296165

(51) Int. Cl.
G06F 3/12 (2006.01)
G06K 15/00 (2006.01)
(52) U.S. Cl. ..................................... 358/1.15; 358/1.16
(58) Field of Classification Search ................. 358/1.15, 358/1.16
See application file for complete search history.

(56) References Cited

U.S. PATENT DOCUMENTS 6,880,124 B1 * 4/2005 Moore .......................... 715/210
2007/0127084 A1   6/2007 Hayashi

FOREIGN PATENT DOCUMENTS

| JP | 11-196206 | 7/1999 |
|---|---|---|
| JP | 11-239238 | 8/1999 |
| JP | 2003-1880 | 1/2003 |
| JP | 2004-343780 | 12/2004 |
| JP | 2005-275808 | 10/2005 |
| JP | 2007-158602 | 6/2007 |
| JP | 2007-317058 | 12/2007 |

OTHER PUBLICATIONS

Japanese Office Action mailed Oct. 19, 2010, directed to Japanese Application No. 2008-296165; 4 pages.

* cited by examiner

*Primary Examiner* — Twyler Haskins
*Assistant Examiner* — Fred Guillermety
(74) *Attorney, Agent, or Firm* — Morrison & Foerster LLP

(57) ABSTRACT

An image processing system includes an image processing apparatus and an information processing apparatus. The information processing apparatus transmits to the image processing apparatus, a job and storage location information indicating a storage location of base data of data included in the job, collectively. Receiving the job and the storage location information, the image processing apparatus records the job and the storage location information in a memory, with interconnections between them.

26 Claims, 11 Drawing Sheets

G0

| Setting | Detail | Printer |

Print Range — Current Sheet
Start Page — Page 1
End Page — Page 10,000
Number of Sets — 1 set(s)

B21: Store in Box
B22: OK
B23: Cancel

User Information
- B2: User Name — User A
- B3: Password — ****

Storage Location Information
- B4: Server Name — Server A
- B5: File Path — C: \ Meeting \ JobA B1: OK
B0: Cancel

| Box | Job Name | Time and Date |
|---|---|---|
| User A > Box > Server A > C Drive > Meeting > Job A ||||

Box tree:
- Box (Root)
  - Server 4
    - C Drive
      - Meeting
      - Shared Holder
  - Client 5
    - D Drive
      - Training Material Jobs:
- Job A — 2008/03/09 10:10
- Job B — 2007/02/12 10:12
- Job B — 2008/03/15 10:50

User A > Box > Server A > C Drive > Meeting > Job A

Reuse job

Job No.212      2008/03/09 10:10

- B7 — Job Name | Job A
- B8 — Number of Sets | 2
- B9 — Single/Double-side | Single-side
- B10 — Detail Setting
- B6 — Execute
- B11 — End

IMAGE PROCESSING SYSTEM, IMAGE PROCESSING METHOD, IMAGE PROCESSING APPARATUS, INFORMATION PROCESSING APPARATUS AND RECORDING MEDIUM

This application claims priority under 35 U.S.C. §119 to Japanese Patent Application No. 2008-296165 filed on Nov. 19, 2008, the entire disclosure of which is incorporated herein by reference in its entirety.

BACKGROUND OF THE INVENTION

1. Field of the Invention

The present invention relates to an image processing system in which an image processing apparatus and an information processing apparatus are interconnected via a network; an image processing method implemented by this image processing system; an image processing apparatus and an information processing apparatus preferably employed in this image processing system; and a computer readable recording medium having an image processing program recorded therein to make a computer execute processing.

2. Description of the Related Art

The following description sets forth the inventor's knowledge of related art and problems therein and should not be construed as an admission of knowledge in the prior art.

Some of the recent image processing apparatuses have a function to temporarily record a print job or a facsimile job in a recording medium, for example a hard disk drive or etc. and then perform print outputting at a user's desired timing, as well as a function to perform print outputting as soon as receiving such a job from an information processing apparatus, for example a personal computer or etc.

Furthermore, there is a well known image processing apparatus that is capable of recording a received job in a segmented memory area called as a "Box". As for Box types, there are so-called "private Boxes" protected by a password or etc. so as to permit accesses only from specific users or groups, so-called "public Boxes" not limiting any accesses, and other types of Boxes.

Regarding such Boxes, as disclosed in Japanese Unexamined Laid-open Patent Publication No. H11-196206, there is a technology including a process of sorting out received facsimile information pieces, which is a facsimile apparatus that sorts out received facsimile information pieces in Boxes that are memory areas segmented for destination addresses detected from the facsimile information pieces.

Meanwhile, as disclosed in Japanese Unexamined Laid-open Patent Publication No. H11-239238, there is the following facsimile apparatus. Receiving a confidential document, the facsimile apparatus stores the confidential document in a personal Box that is a memory area exclusively provided for a receiver user to which the confidential document is addressed, and also registers a storage location of the confidential document into a Web server inside thereof. After that, the facsimile apparatus transmits an e-mail to the receiver user to notify of the receipt of the confidential document. Receiving this e-mail, the receiver user accesses the facsimile apparatus and enters an ID and a password by operating the personal computer. Then, the facsimile apparatus transmits to the receiver user, linkage information to access the confidential document, and thus the receiver user is allowed to access the confidential document by using this information.

However, even if such an apparatus stores in Boxes, jobs that are received from an information processing apparatus by using the Box function as described above, it is still a problem that the user tends to forget which job is stored in which Box due to passage of time, and thus the jobs in the Boxes cannot be reused efficiently.

In this case, some users transmit a job to the image processing apparatus again by operating their own information processing apparatuses, in order to make it execute the job, even knowing that the job already exists in either of the Boxes. This is not an efficient manner.

Furthermore, users sometimes would like to check in which folder of which information processing apparatus base data of data included in a job exists, for example for the purpose of editing the base data stored in a Box of an image processing apparatus, but conventionally, this demand cannot be satisfied. This is also a problem.

The technologies described in the two above-mentioned publications do not provide a complete solution against those problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing system that is capable of improving the user operability of an image processing apparatus for reusing a plurality of jobs received from an information processing apparatus then stored in the image processing apparatus, and thus allowing users to effectively reuse a job among those stored therein by operating the image processing apparatus and also allowing them to easily check in which folder of which information processing apparatus, base data of data included in the job is stored.

It is another object of the present invention to provide an image processing method that is implemented by the image processing system.

It is yet another object of the present invention to provide an image processing apparatus that is preferably employed in the image processing system.

It is still yet another object of the present invention to provide a computer readable recording medium having an image processing program recorded therein to make a computer of the image processing apparatus execute image processing.

It is further still yet another object of the present invention to provide an information processing apparatus that is preferably employed in the image processing system.

It is further still yet another object of the present invention to provide an image processing program that is recorded in a computer readable recording medium to make a computer of the information processing apparatus execute image processing.

According to a first aspect of the present invention, an image processing system includes an image processing apparatus and an information processing apparatus are interconnected via a network, and wherein:

the information processing apparatus comprises:
  an acceptor that accepts a user's specified data and requested job to be executed on the specified data;
  a storage location information generator that generates storage location information indicating a storage location of the specified data; and a transmitter that transmits to the image processing apparatus, the job accepted by the acceptor and the storage location information generated by the storage location information generator, collectively, and the image processing apparatus comprises:
   a receiver that receives the job and the storage location information; and
   a memory that records in itself, the job and the storage location information received by the receiver, with interconnections between them.

According to a second aspect of the present invention, an image processing method implemented by an image processing system including an image processing apparatus and an information processing apparatus interconnected via a network, includes:

the information processing apparatus's:
   accepting a user's specified data and requested job to be executed on the specified data;
   generating storage location information indicating a storage location of the specified data; and
   transmitting to the image processing apparatus, the accepted job and the generated storage location of the data, collectively, and the image processing apparatus's:
   receiving the job and the storage location information; and
   recording in a memory, the received job and storage location information, with interconnections between them.

According to a third aspect of the present invention, an image processing apparatus includes:
   a receiver that receives a job and storage location information indicating a storage location of base data of data included in the job, which are collectively transmitted by an information processing apparatus, via a network; and
   a memory that records in itself, the job and the storage location information received by the receiver, with interconnections between them.

According to a fourth aspect of the present invention, a computer readable recording medium has an image processing program recorded therein to make a computer of an image processing apparatus execute:
   receiving a job and storage location information indicating a storage location of base data of data included in the job, which are collectively transmitted by an information processing apparatus, via a network; and
   recording in a memory, the received job and storage location information, with interconnections between them.

According to a fifth aspect of the present invention, an information processing apparatus includes:
   an acceptor that accepts a user's specified data and requested job to be executed on the specified data;
   a storage location information generator that generates storage location information indicating a storage location of the specified data; and
   a transmitter that transmits to an image processing apparatus, the job accepted by the acceptor and the storage location information generated by the storage location information generator, collectively, via a network.

According to a sixth aspect of the present invention, a computer readable recording medium has an image processing program recorded therein to make a computer of an information processing apparatus execute:
   accepting a user's specified data and requested job to be executed on the specified data;
   generating storage location information indicating a storage location of the specified data; and
   transmitting to an image processing apparatus, the accepted job and the generated storage location information, collectively, via a network.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6 (*a*) is a view showing an example of a setting screen to make a setting of a print job, and FIG. 6(*b*) is a view showing an example of a resetting screen to change the setting of a job;

FIG. 9 is a view showing an example of a job selection screen in which jobs are displayed in the folder tree-view;

FIG. 10 is a view showing an example of a job reuse screen;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be explained with reference to Figures. One same code is given to common portions in the following embodiments, and the common portions will be explained only once to avoid repetition.

First Embodiment

Figure 1:
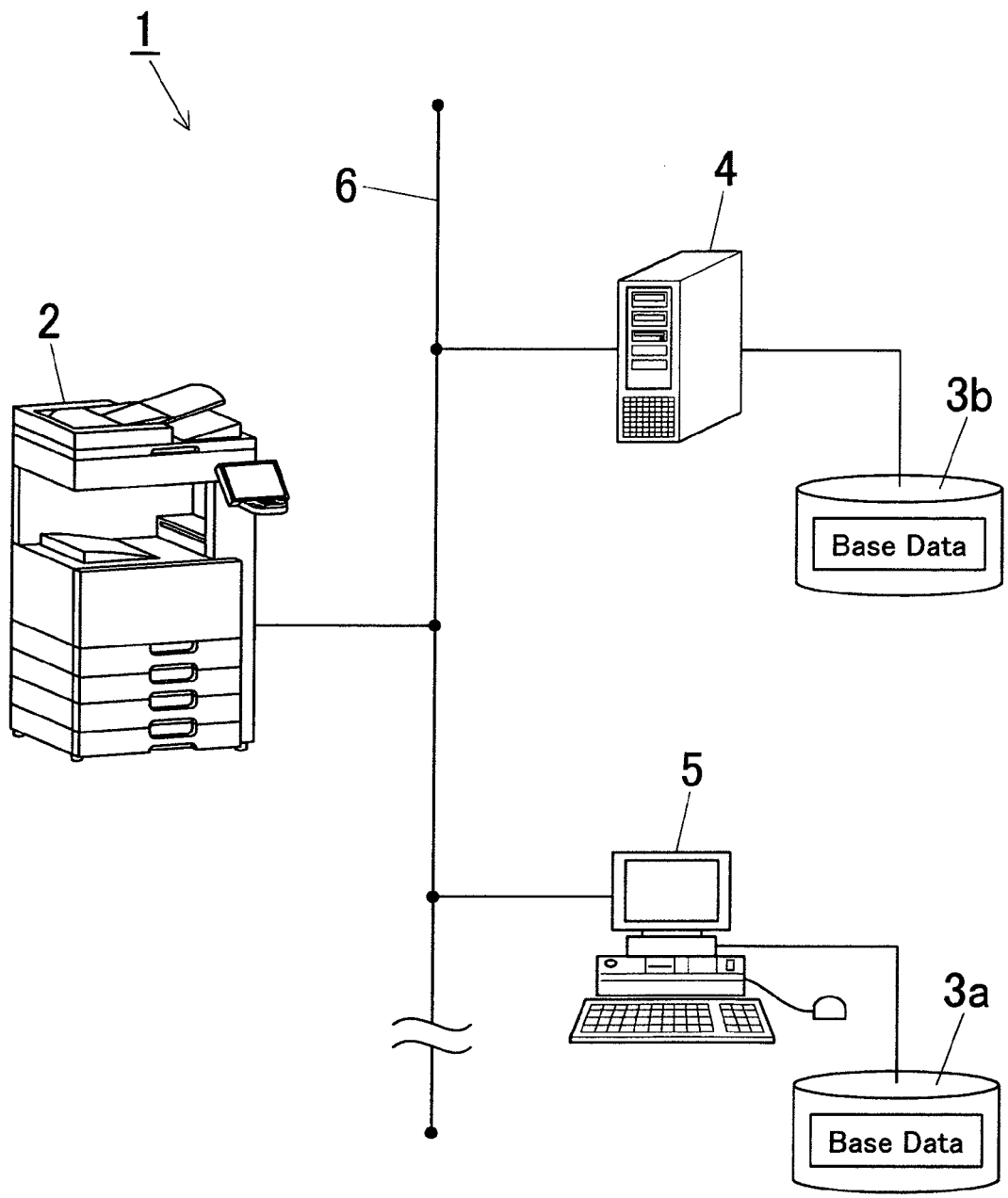
FIG. 1 is a view schematically showing a configuration of an overall image processing system according to one embodiment of the present invention.

FIG. 1 is a view schematically showing a configuration of an entire image processing system 1 according to one embodiment of the present invention.

This image processing system 1 includes an image processing apparatus 2 that is called as "multifunctional machine", "MFP (Multi Function Peripheral)" or etc., a server computer (hereinafter will be simply referred to "server") 4 having a memory 3a such as a hard disk drive, storing in itself a great deal of electronic data of documents, images and etc., a personal computer (hereinafter will be simply referred to as "client") 5, and others. And these are configured so as to access each other via a network 6 such as a wired or wireless LAN, and exchange data with each other.

The server 4 and the client 5 correspond to information processing apparatuses connected to the network 6.

Figure 2:
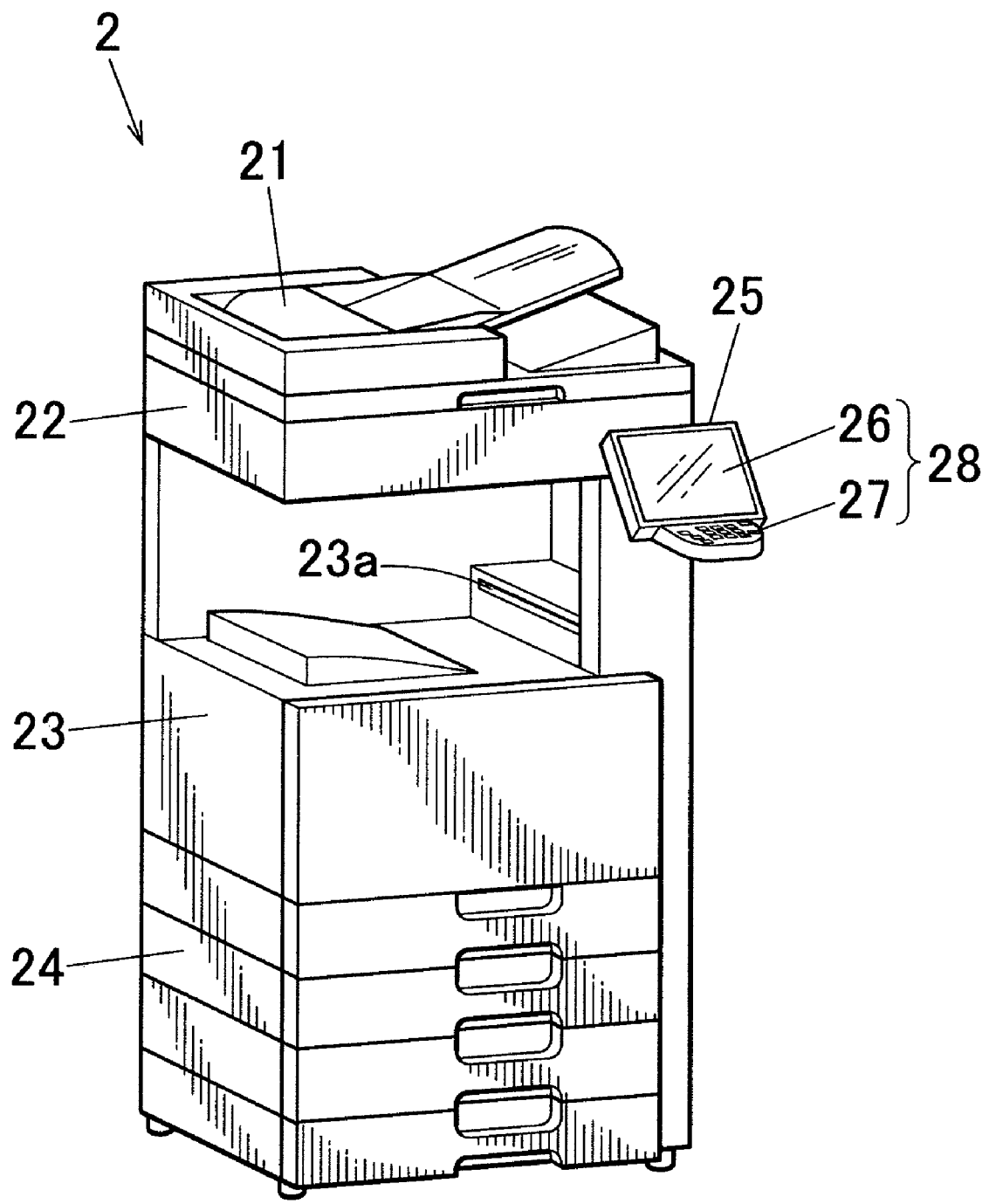
FIG. 2 is a view externally showing an example of an image processing apparatus employed in the image processing system shown in FIG. 1.

FIG. 2 is a view externally showing an example of the image processing apparatus 2. For example, in this embodiment, the image processing apparatus 2 is a multifunctional machine, a MFP collectively having the functions of copying, network printing, scanning, facsimile (FAX) and other functions, and etc., as described above. However, the image processing apparatus 2 is not limited thereto, and it may be an apparatus simply having the function of network printing, for example.

As shown in FIG. 2, this information processing apparatus 2 has a document conveyer 21 and a scanner 22 at the top thereof, and in such a configuration, the document conveyer 21 automatically conveys one by one, sheets of a document to the scanner 22, and thereby the scanner 22 optically reads characters, marks, images and etc. recorded on the sheets.

There provided down the scanner 22, a printer 23. There provided further down the printer 23, a sheet feeder 24 feeding sheets to the printer 23. The printer 23 functions to execute jobs related to copying, network printing and FAX, and is configured so as to form an image on a sheet provided by the sheet feeder 24 and output a printed sheet from a discharge outlet 23a.

In the foreside of the image processing apparatus 2, there provided a display 25 such as a liquid crystal display, displaying information about jobs and other information for users; a touch panel 26 installed on the top surface of the display 25; and an operation portion 28 consisting of a plurality of operation buttons 27 that are positioned around the display 25.

Figure 3:
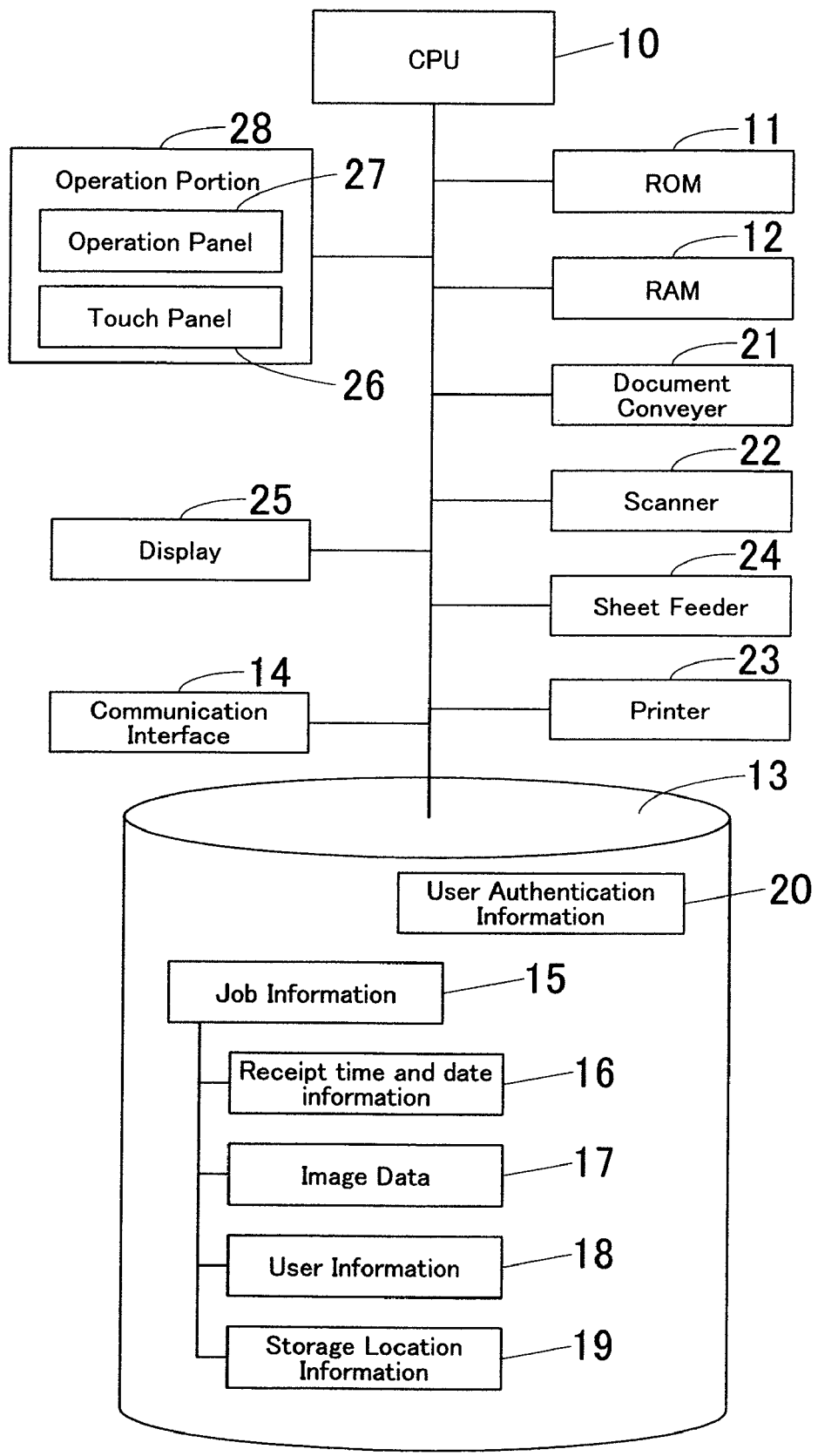
FIG. 3 is a view showing an example of a hardware configuration of the image processing apparatus.

FIG. 3 is a view showing an example of a hardware configuration of the image processing apparatus 2. In the above-described configuration, the image processing apparatus 2 further includes a CPU 10, a ROM 11, a RAM 12, a memory 13 and a communication interface 14.

The CPU 10 implements the basic functions (copying, network printing, scanning, FAX and etc.) expected for the image processing apparatus 2, by calling out and executing a program stored in the ROM 11, and further implements various functions as to be described later.

The memory 13 is a memory consisting of hard disk drives or memory areas, and it records in itself, job information 15, user authentication information 20 and other information.

The job information 15 herein means information of a job received by the image processing apparatus 2. It includes data (file) to be processed by the job, a name of the data, terms for job execution, receipt time and date information 16, image data 17, user information 18, storage location information 19 and other information.

The receipt time and date information 16 herein means information indicating a time and date that a job is received at, by the image processing apparatus 2. This information is generated when a job is received by the image processing apparatus 2, via the network 6.

The image data 17 herein means image data into which row data to be processed by a job is converted by an image data conversion program.

The user information 18 herein means information indicating the user who issued a job, which is received together with the job by the image processing apparatus 2, via the network 6. For example, in this embodiment, the user information 18 includes login information (user ID and password) to login the server 4 and the client 5.

The storage location information 19 herein means information indicating a storage location of a user's specified base data of data included in a job (for example, electronic data of a document or an image, to be printed out), which is received together with a job by the image processing apparatus 2, via the network 6. For example, in this embodiment, the storage location information 19 includes the server 4's address and server name, the client 5's address and client name, and information to specify a shared folder of the memory 3a and 3b, storing base data (file paths).

The user authentication information 20 herein means information to limit users' use of the image processing apparatus 2. For example, the user authentication information 20 includes a user ID, a password and etc. of a user authorized to use the image processing apparatus 2.

The communication interface 14 functions as a communicator to communicate with external apparatuses. For example, it serves to exchange data with information processing apparatuses such as the server 4 and the client 5 via the network 6, and transmits and receives FAX via a telephone circuit. As the communication interface 14, a NIC (Network Interface Card), a modem, a TA (Terminal Adapter), a wireless communication system or etc. is employed, for example.

The latest version of a program recorded in the ROM 11 may be downloaded from an external apparatus via the network 6, and thereby the program is updated.

Figure 4:
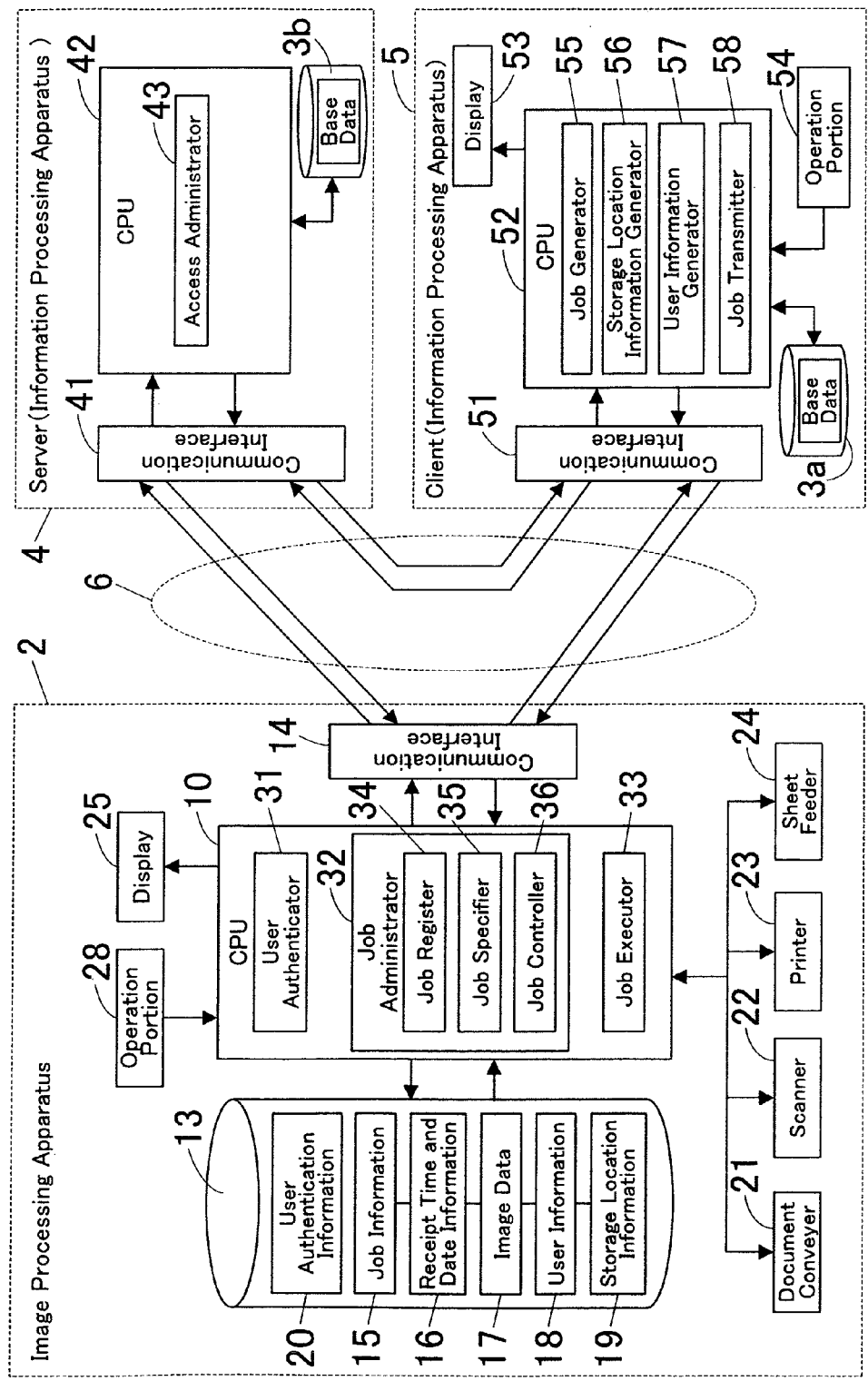
FIG. 4 is a block diagram showing a functional configuration of the image processing system.

FIG. 4 is a block diagram showing a functional configuration of the image processing system 1 according to one embodiment of the present invention. By executing the program described above, the CPU 10 of the image processing apparatus 2 functions as a user authenticator 31, a job administrator 32 and a job executor 33.

The user authenticator 31 is a functional portion to authenticate users' use of the image processing apparatus 2.

The job administrator 32 registers job information 15 of jobs received via the network 6, and calls out a job to be executed among the job information 15 to make the job executed. This job administrator 32 includes a job register 34, a job specifier 35, a job controller 36, and etc.

The job register 34 registers a job by recording the job information 15 of a received job, in the memory 13.

The job controller 36 converts into the image data 17, row data to be processed by a received job, and then records it in the memory 13.

The job specifier 35 specifies a job among a plurality of jobs recorded in the memory 13, according to user instruction.

According to an instruction of the job controller 36, the job executor 33 executes a job, by driving the document conveyer 21, the scanner 22, the printer 23 and the sheet feeder 24.

Meanwhile, the server 4 includes a communication interface 41 and a CPU 42, as well as the memory 3b described above. The communication interface 41 serves to exchange data with the client 5 and the image processing apparatus 2, via the network 6.

The CPU 42 executes various functions of the server 4, and also functions as an access administrator 43 that administers access rights, so that authorization could be performed when the client 5 or the image processing apparatus 2 tries to access data (also referred to as "file") stored in the memory 3b, via the network 6.

The client 5 includes a communication interface 51, a CPU 52, a display 53 and an operation portion 54.

The communication interface 51 serves to exchange data with the server 4 and the image processing apparatus 2, via the network 6.

The CPU 52 executes various functions of the client 5, and functions as a job generator 55 that generates a job by activating driver software such as a printer driver when a user enters an instruction to execute a job by the image processing apparatus 2, by operating the operation portion 54 including a keyboard, a mouse and etc.; a storage location information generator 56; a user information generator 57; and a job transmitter 58, collectively In such a configuration, by operating the client 5, a user owning the client 5 accesses the server 4, specifies a file to be processed by a print job for example, among one or more than one files stored in the memory 3b, and gives an instruction. Then, a printer driver installed on the client 5 is activated, and thereby the user information generator 57 executes its function, generating user information based on login information of the user who accessed the server 4. Furthermore, the storage location information generator 56 executes its function, generating storage location information that is a path (address or folder path) to access the base data.

And furthermore, the job generator 55 executes its function, generating a job based on the base data to be printed out, and the job transmitter 58 executes its function, transmitting the job to the image processing apparatus 2.

More accurately, the job transmitter 58 transmits the job to the image processing apparatus 2 via the network 6, together with the user information generated by the user information generator 57 and the storage location information generated by the storage location information generator 56. Receiving one set of the job, the user information and the storage location information, for example, the image processing apparatus 2 recognizes that the job, the user information and the storage location information are interconnected.

Figure 5:
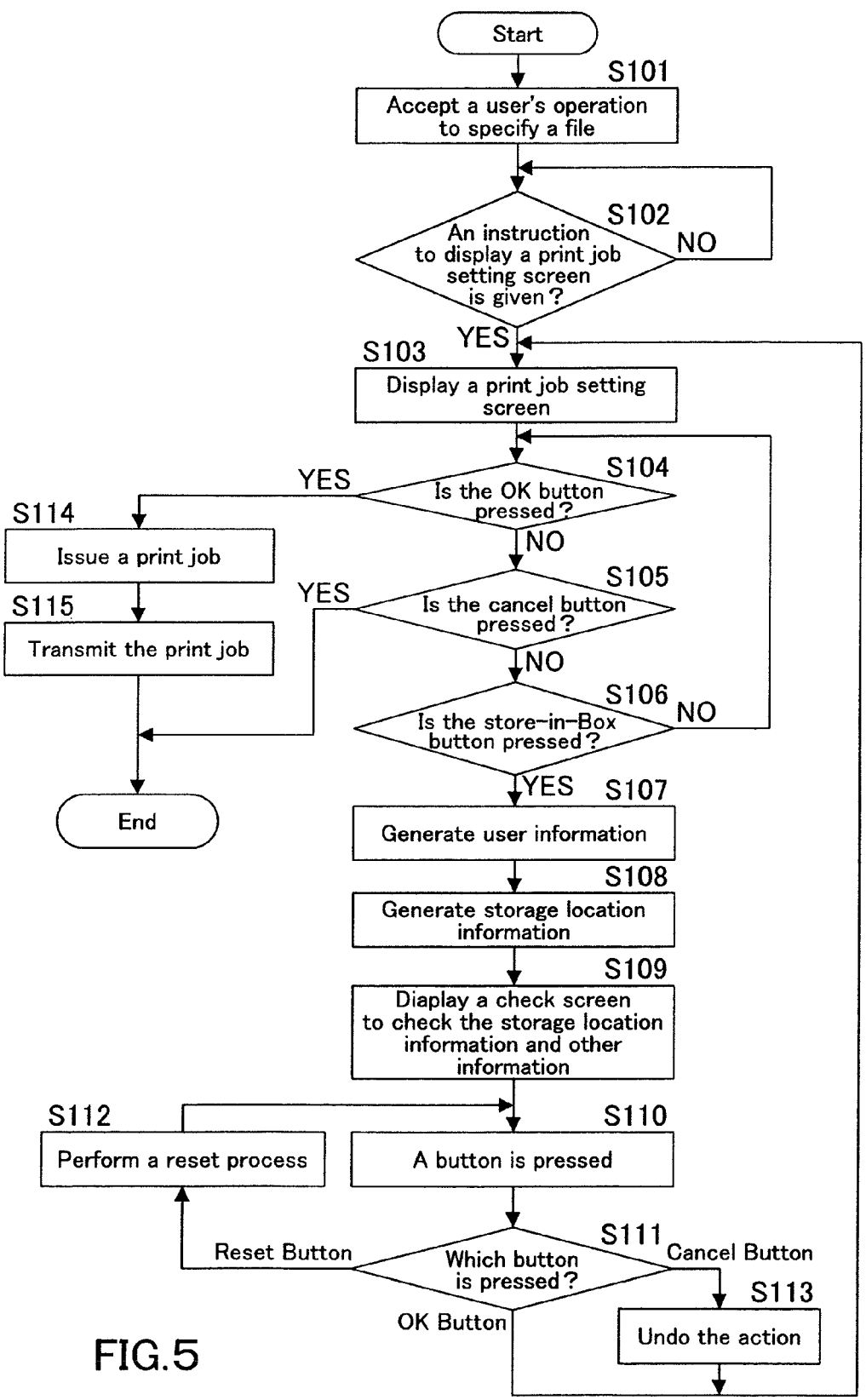
FIG. 5 is a flowchart representing a process routine executed in a client (image processing apparatus)

FIG. 5 is a flowchart representing a process routine executed in the client 5 of the image processing system 1. This process routine is executed by the CPU 52 according to a predetermined program recorded in a recording medium such as a ROM not shown in Figures.

For example, a user specifies a file to be processed by a print job for example, via the display 53 of the client 5 displaying a list of the files stored in the memory 3b of the server 4, by operating the operation portion 54. Then, this operation is accepted and the specified file is opened, in Step S101.

And in Step S102, the routine waits until an instruction to display a print job setting screen is given by the user. If an instruction to display a print job setting screen is given (YES in Step S102), a print job setting screen is displayed by a printer driver, on the display 53 of the client 5, in Step S103.

FIG. 6(a) shows the print job setting screen G0. In this setting screen G0, as well as an ordinary setting window to set a print condition, a store-in-Box button B21, an OK button 22 and a cancel button B23 are shown.

The store-in-Box button B21 is an operation button to store the job in a predetermined Box of the image processing apparatus 2. When the store-in-Box button B21 is pressed, a check screen G1 to check storage location information and etc. is displayed on the display 53, as shown in FIG. 6(b). The OK button B22 is an operation button to transmit the job to the image processing apparatus 2, together with a set condition. The cancel button B23 is an operation button to cancel a setting.

Back to FIG. 5, it is judged in Step S104, whether or not the OK button B22 is pressed via the print job setting screen G0 of FIG. 6(a). If it is not pressed (NO in Step S104), then it is judged in Step S105, whether or not the cancel button B23 is pressed.

If the cancel button B23 is not pressed (NO in Step S105), then it is judged in Step S106, whether or not the store-in-Box button B21 is pressed. If the store-in-Box button B21 is not pressed (NO in Step S106), the routine goes back to Step S104.

If the store-in-Box button B21 is pressed (YES in Step S106), user information is generated based on login information of the user who accessed the server 4, in Step S107. And storage location information of the specified file (data) is generated in Step S108.

Subsequently, in Step S109, the check screen G1 to check storage location information of the file and other information is displayed on the display 53, as shown as an example in FIG. 6(b). In this check screen G1, as well as the generated user information and storage location information, the following various buttons are shown.

The user name reset button B2 is an operation button to change a user name, and the password reset button B3 is an operation button to change a password. The server name reset button B4 is an operation button to change a server name, and the file path name reset button B5 is an operation key to change a file path. Meanwhile, at the bottom of the check screen G1, an OK button B1 and a cancel button B0 that can be operated by users, are further shown. When the OK button B1 is pressed by the user, a setting changed by the user is validated, and then the screen returns to the print job setting screen G0 of FIG. 6(a). When the cancel button B0 is pressed by the user, a setting changed by the user is canceled, and then the screen returns to the print job setting screen G0 of FIG. 6(a).

Back to FIG. 5, the check screen G1 to check storage location information of the file and other information is displayed on the client 5 (Step S109), and in this state of things, the routine waits until any button is pressed by the user in Step S110. In Step S111, it is judged which button is pressed.

If the reset button B2, B3, B4 or B5 is pressed ("Reset Button" in Step S111), the routine proceeds to Step S112 wherein a reset process is performed, then goes back to Step S110.

If the OK button B1 is pressed ("OK Button" in Step S111), the routine goes back to Step S103, and wherein the print job setting screen G0 is displayed. If the cancel button B0 is pressed ("Cancel Button" in Step S111), then in Step S113, if the user changed the setting, this action is undone. And then, the routine goes back to Step S103, and wherein the print job setting screen G0 is displayed.

Meanwhile, in Step S104, if the OK button B22 is pressed via the print job setting screen G0 (YES in Step S104), the routine proceeds to Step S114, and wherein a print job is issued. After that, the print job is transmitted to the image processing apparatus 2 in Step S115.

In this Step, if the store-in-Box button B21 is not pressed in advance, the print job is transmitted to the image processing apparatus 2, as per normal. Meanwhile, if the store-in-Box button B21 is pressed in advance, the print job, the user information and the storage location information are collectively transmitted to the image processing apparatus 2, so that the print job could be stored in a Box of the image processing apparatus 2.

Meanwhile, in Step S105, if the cancel button B23 is pressed (YES in Step S105), the job generator 55 finishes processing.

In this embodiment above, a file stored in the memory 3b of the server 4 is specified and a print job is generated, via the client 5. Alternatively, when a file stored in the memory 3a of the client 5 is specified and a print job is generated, the print job is transmitted to the image processing apparatus 2 together with the user information and the storage location information, just as in the way described above.

Furthermore, in this embodiment above, the print job setting screen G0 is displayed. Alternatively, when the print job setting screen G0 is not displayed and a print job is generated by dragging and dropping a file into a printer icon displayed on the image processing apparatus 2, for example, the print job is transmitted to the image processing apparatus 2 together with the user information and the storage location information, just as in the way described above. In this case, it is obvious that users cannot change the user information and the storage location information, via the check screen G1.

Subsequently, the image processing apparatus 2 receives the job via the network 6. Then, the communication interface 14 executes its functions, that is, it generates receipt time and date information 16 and gives it to the job register 34. If the image processing apparatus 2 receives the job together with the user information, the user authenticator 31 executes its functions, that is, it judges whether or not to permit the user to register the job, based on the user authentication information 20.

If the user is permitted to register the job, the job controller 36 executes its functions and converts the included in the received job, into the image data 17. And then, the job register 34 executes its functions, that is, it connects the received job to the receipt time and date information 16, the user information 18 and the image data 17, respectively, and registers them in the memory 13. If the image processing apparatus 2 receives the job together with the storage location information 19, the job register 34 connects the job to the storage location information 19, and registers them in the memory 13.

As described above, the memory 13 records in itself, a job received via the network 6, the image data 17 to which data included in the job is converted, the user information 18 and the storage location information 19 received together with the job, with interconnections between them.

And thus, when a user who logged in after being authenticated, selects one job among a plurality of jobs recorded in the memory 13, the job controller 36 of the image processing apparatus 2 extracts the jobs connected to the user, based on the user information 18 connected to the jobs and recorded therein, and the display 25 displays on itself, the extracted jobs in the folder tree-view, based on the storage location information 19. At the same time, the display 25 also displays the time and dates that the jobs are received at.

Users may perform an operation to log in the image processing apparatus 2 by using the operation portion 28 of the image processing apparatus 2, or may perform a remote operation via the network 6, by using the client server 5 or the server 4. If a user performs a remote operation to log in the image processing apparatus 2 via the network 6, by using the client 5 or the server 4, the jobs connected to the user are displayed in the folder tree-view, based on the storage location information, just as in the case where the user performs a direct login operation by using the image processing apparatus 2.

Figure 7:
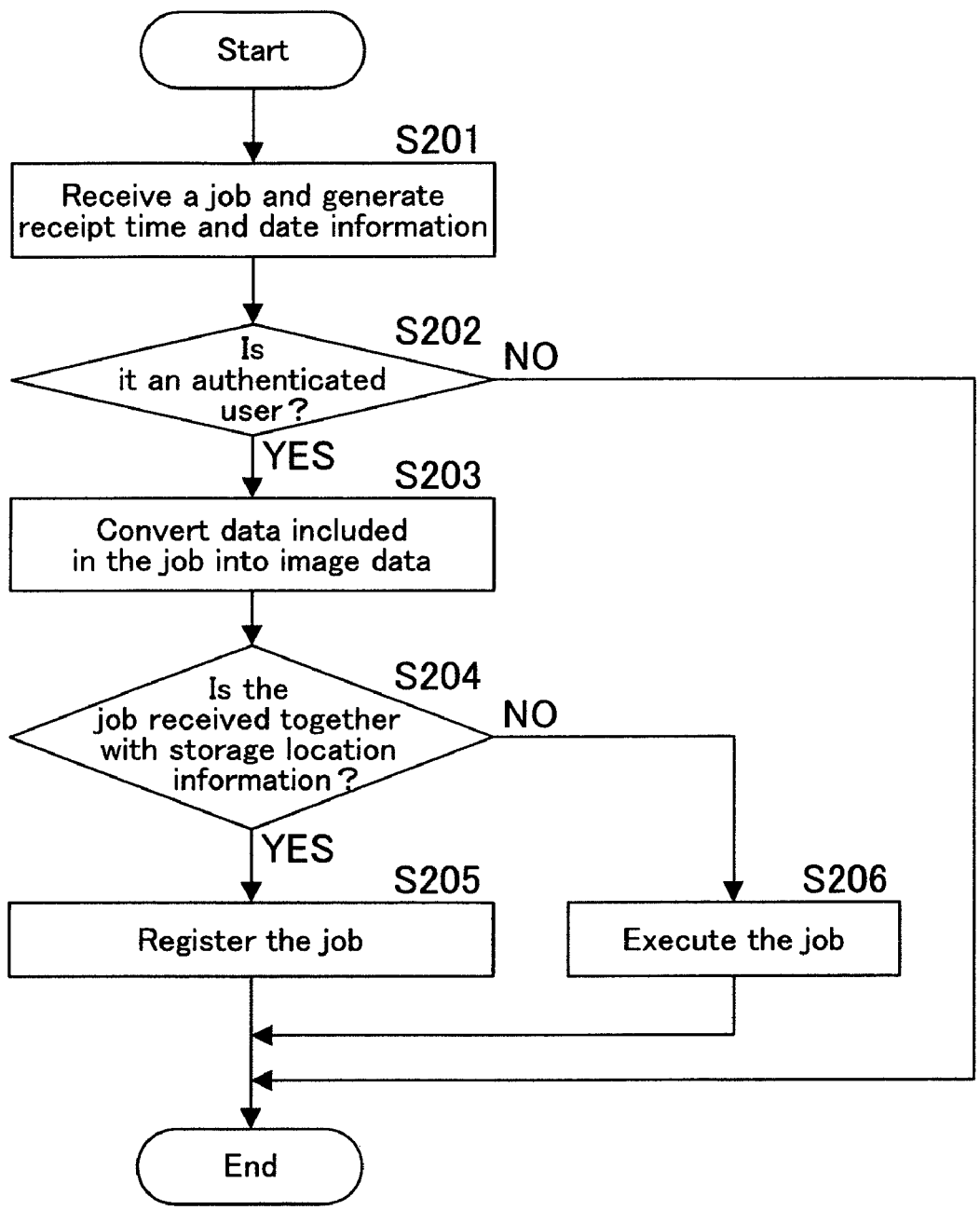
FIG. 7 is a flowchart representing a process routine that is executed in the image processing apparatus to register a received print job.

FIG. 7 is a flowchart representing a process routine executed in the image processing apparatus 2, when a job is received. This process routine is executed by the CPU 10 according to a program stored in a recording medium such as the ROM 11 or the memory 13.

Hereinafter, an embodiment will be explained, wherein a job can be executed if the image processing apparatus 2 receives the job together with storage location information, as a matter of course, meanwhile a job also can be executed even if the image processing apparatus 2 receives the job without storage location information.

In the image processing apparatus 2, a job is received via the network 6 and the receipt time and date information 16 is generated in Step S201. Then in Step S202, based on user information received together with the job, it is judged whether or not it is an authenticated user.

If it is not an authenticated user (NO in Step S202), the routine immediately terminates. If it is an authenticated user (YES in Step S202), data included in the job is converted into image data in Step S203. After that, it is judged in Step S204, whether or not the job is received together with storage location information of the base data.

If the job is received together with the storage location information (YES in Step S204), then in Step S205, the job is connected to the receipt time and date information 16, the image data 17, the user information 18 and the storage location information 19, respectively, and these are recorded in the memory 13. In this way, registration of the job is completed.

Meanwhile, if the job is received without the storage location information by the image processing apparatus 2 (NO in Step S204), the received job is executed in Step S206.

This is how the image processing apparatus 2 registers a received job.

And as described above, in this embodiment, the image processing apparatus 2 connects a job to storage location information indicating a storage location of base data of data included in the job, and records them in the memory 13. Thus, when a user performs a direct operation by using the image processing apparatus 2 or a remote operation by using the client 5 or etc. to reuse a job recorded in the image processing apparatus 2, jobs can be listed by segments based on the storage location information of the data. For example, jobs can be listed by storage locations and storage locations can be shown in the tree-view. And among those, the user can easily find out a target job to reuse. This would improve the operability and the effectiveness of reusing a job.

Figure 8:
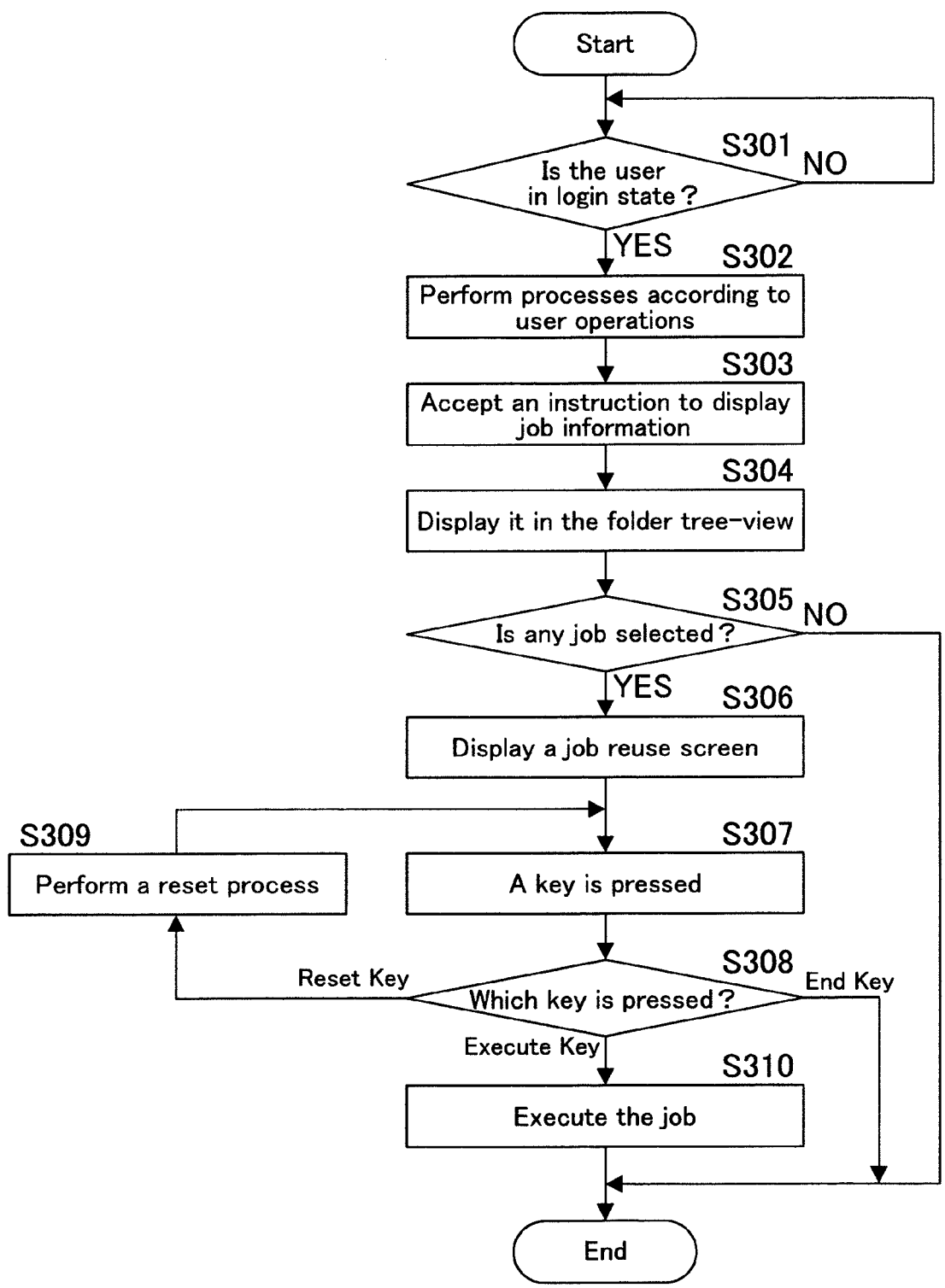
FIG. 8 is a flowchart representing a process routine that is executed in the image processing apparatus to reuse a job.

FIG. 8 is a flowchart representing a process routine that is executed in the image processing apparatus 2 to reuse a job. This process routine is also executed by the CPU 10 according to a program stored in a recording medium such as the ROM 11 or the memory 13.

Initially, a user performs an operation. Then in Step S301, the user authenticator 31 of the image processing apparatus 2 executes its functions, that is, it judges whether or not the user is in login state.

If the user enters a user ID and a password and is authenticated thereby (YES in Step S301), then in Step S302, the following various user operations are accepted, and processes are performed accordingly. When the user gives an instruction to display the job information 15 by operating the operation portion 28 of the image processing apparatus 2, this instruction is accepted in Step S303.

Subsequently, the image processing apparatus 2 extracts the receipt time and date information 15 and the storage location information 17, from the job information 15 recorded in the memory 13. And the jobs connected to the user authenticated by the authenticator 31 are extracted from a plurality of jobs recorded in the memory 13, based on the user information 18 connected to the jobs and recorded therein. And then, in Step S304, the extracted jobs are displayed on the display 25, in the folder tree-view, based on the storage location information 19. At the same time, the receipt time and date information 16 of the respective jobs are also displayed thereon.

FIG. 9 shows a job selection screen G2, in which the jobs connected to the login user are displayed on the display 25, in the folder tree-view.

Users can effectively check the jobs recorded in the image processing apparatus 2, via the job selection screen G2. And among the jobs, the user selects a target job to reuse, by touching the section where the job is displayed. In this example of FIG. 9, a Job A to be executed on base data stored in the folder titled as "Meeting", existing in the C drive of the server 4, is selected.

Back to FIG. 8, in the image processing apparatus 2, it is judged whether or not a job is selected by the user, in Step S305. If a job is selected (YES in Step S305), then in Step S306, the job specifier 35 executes its functions, that is, specifies the job that is selected by the user among the plurality of jobs recorded in the memory 13 and displays a job reuse screen including a reset key, on the display 25.

Meanwhile, in Step S305, if no job is selected (NO in Step S305), the routine terminates.

FIG. 10 is a view showing an example of a job reuse screen G3 that is displayed on the display 25 in Step S306.

In the job reuse screen G3, detail information of the user's selected job and operation keys are displayed. A job name reset key B7 is an operation key to change a job name, a number-of-sets reset key B8 is an operation key to change the number of sets (the number of copies) to be issued by the job, and a single-side/both-side key 69 is an operation key to switch between single-side printing and both-side printing. A detail setting key B10 is an operation key to change other settings, for example, to switch between monochrome printing and full-color printing and to switch between scale-up printing and scale-down printing.

Furthermore, in the lower region of the job reuse screen G3, an execute key B6 and an end key B11 are displayed. When a user presses the execute key B6, a job is executed based on the changed job information, by the image processing apparatus 2. When a user presses the end key B11, the process ends.

Back to FIG. 8, while the job reuse screen G3 is displayed thereon, the job administrator 32 waits until any key is pressed by the user, in Step S307. If any of the reset keys B7 through B10 is pressed ("Reset Key" in Step S308), the routine proceeds to Step S309, and wherein the job controller 36 performs a reset process. Then, the routine goes back to Step S307.

If the execute key B6 is pressed, the job administrator 32 recognizes it is the execute key ("Execute Key" in Step S308). Then, the job executor 33 executes the job based on the changed job information, in Step S310.

If the end key B11 displayed in the job reuse screen G3 is pressed by the user, the job administrator 32 recognizes it is the end key ("End Key" in Step S308). Then, the routine terminates.

As described above, in this embodiment, when receives a job together with the user information 18 of the job and the storage location information 19 of base data, via the network 6, the image processing apparatus 2 connects the job to the user information 18 and the storage location information 19 and records them in the memory 13. And then, when a user reuses a job by operating the image processing apparatus 2, the jobs connected to the user are displayed in the folder tree-view, based on the information recorded therein. And thus, the user can easily select a preferable job just like selecting a predetermined file among those that are displayed on his/her using client in the folder tree-view. This would improve the operability.

Also, when the user hopes to know in which folder of the server 4 or the client 5, base data is stored, he/she can easily find that folder via the job selection screen in which jobs are displayed in the folder tree-view.

Second Embodiment

Hereinafter, a second embodiment of the present invention will be explained.

In the first embodiment explained above, when a user hopes to reuse a job, he/she has to select a target job to reuse among those that are displayed in the job selection screen G2 of FIG. 2, in the folder tree-view.

However, if many jobs are registered in the image processing apparatus 2, such many jobs are displayed in the job selection screen G2 and it wouldn't be so easy to select one target job to reuse among those.

The second embodiment to be explained below would improve the operability, so that the user could easily perform an operation to reuse a job even in such a case. Since the hardware configuration of the image processing apparatus 1 and the functional configuration of the image processing apparatus 2 employed here in the second embodiment are exactly the same as the first embodiment, explanation thereof will be omitted.

In the second embodiment, when receives a job together with the user information 18 and the storage location information 19 of base data, via the network 6, the image processing apparatus 2 connects the received job to the user information 18 and the storage location information 19, then records and registers them in the memory 13. And furthermore, the image processing apparatus 2 gives identification information to identify the job, for example a ground pattern or an electronic watermark, to the image data 17 to which data included in the job is converted, and prints out on paper the image data 17 and the identification information.

Figure 11:
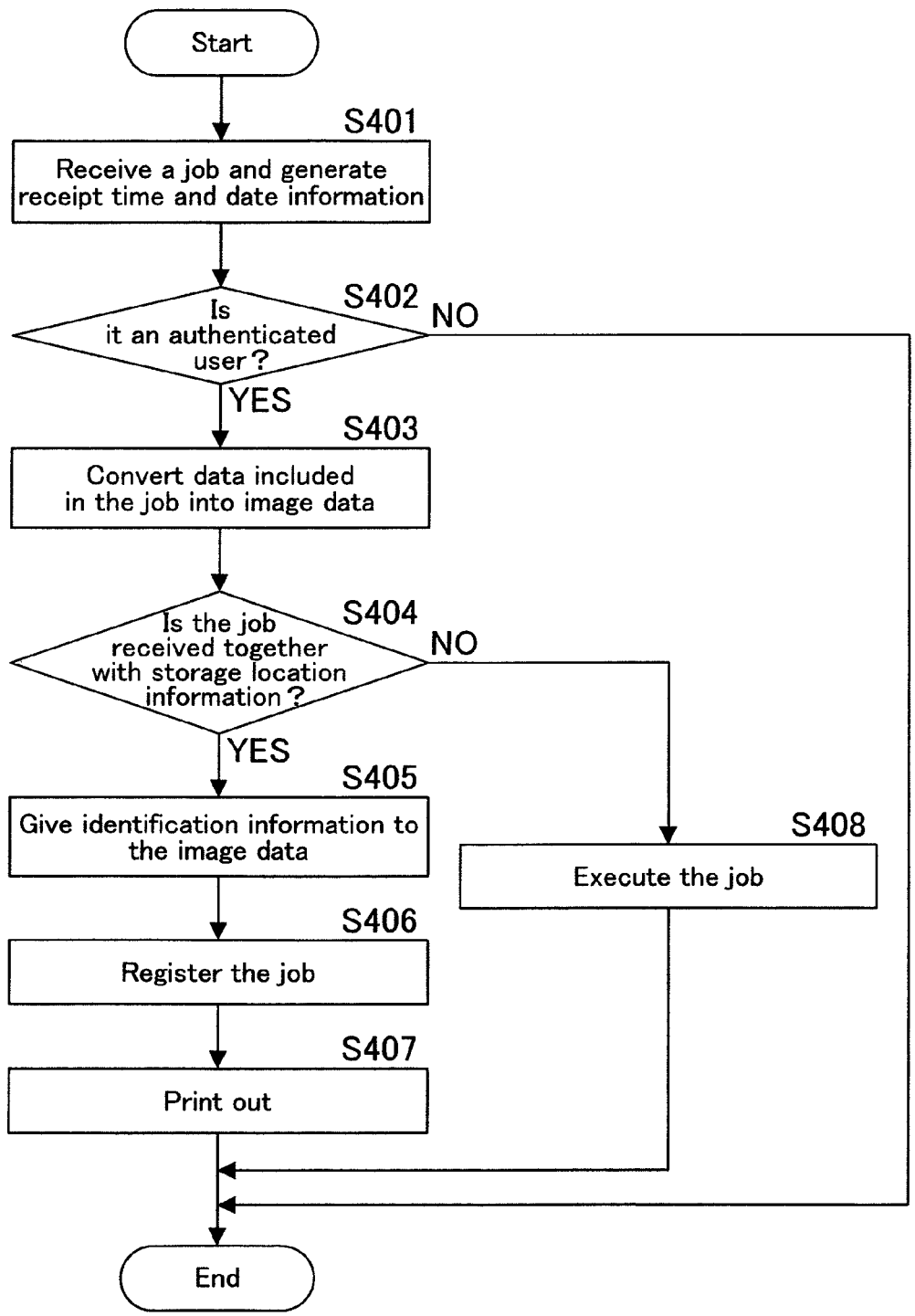
FIG. 11 refers to another embodiment of the present invention, and is a flowchart representing a process routine that is executed in the image processing apparatus when a print job is received.

FIG. 11 is a flowchart representing a process routine that is executed in the image processing apparatus 2 when a job is received, in the second embodiment. And this flowchart has some parallels with that of FIG. 7, previously explained in the first embodiment. This process routine is also executed by the CPU 10 according to a program stored in a recording medium such as the ROM 11 or the memory 13.

In the image processing apparatus 2, a job is received via the network 6 and the receipt time and date information 16 is generated in Step S401. Then in Step S402, based on user information received together with the job, it is judged whether or not it is an authenticated user.

If it is not an authenticated user (NO in Step S402), the routine immediately terminates. If it is an authenticated user (YES in Step S402), data included in the job is converted into image data in Step S403. After that, it is judged in Step S404, whether or not the job is received together with storage location information of the base data.

If the job is received together with the storage location information (YES in Step S404), then in Step S405, identification information to identify the job, for example a job number, is given to the image data. After that, in Step S406, the job is connected to the receipt time and date information 16, the image data 17, the user information 18 and the storage location information 19, respectively, and these are recorded in the memory 13. In this way, registration of the job is completed.

Subsequently, in Step S407, the image data holding the identification information is printed out on paper.

Meanwhile, if the job is received without the storage location information by the image processing apparatus 2 (NO in Step S404), the received job is executed in Step S406.

As described above, in this embodiment, when receives a job together with storage location information of base data, the image processing apparatus 2 registers the job with identification information and prints out on paper, image data holding the identification information.

By using the printed paper, users can effectively reuse a job as the following.

Figure 12:
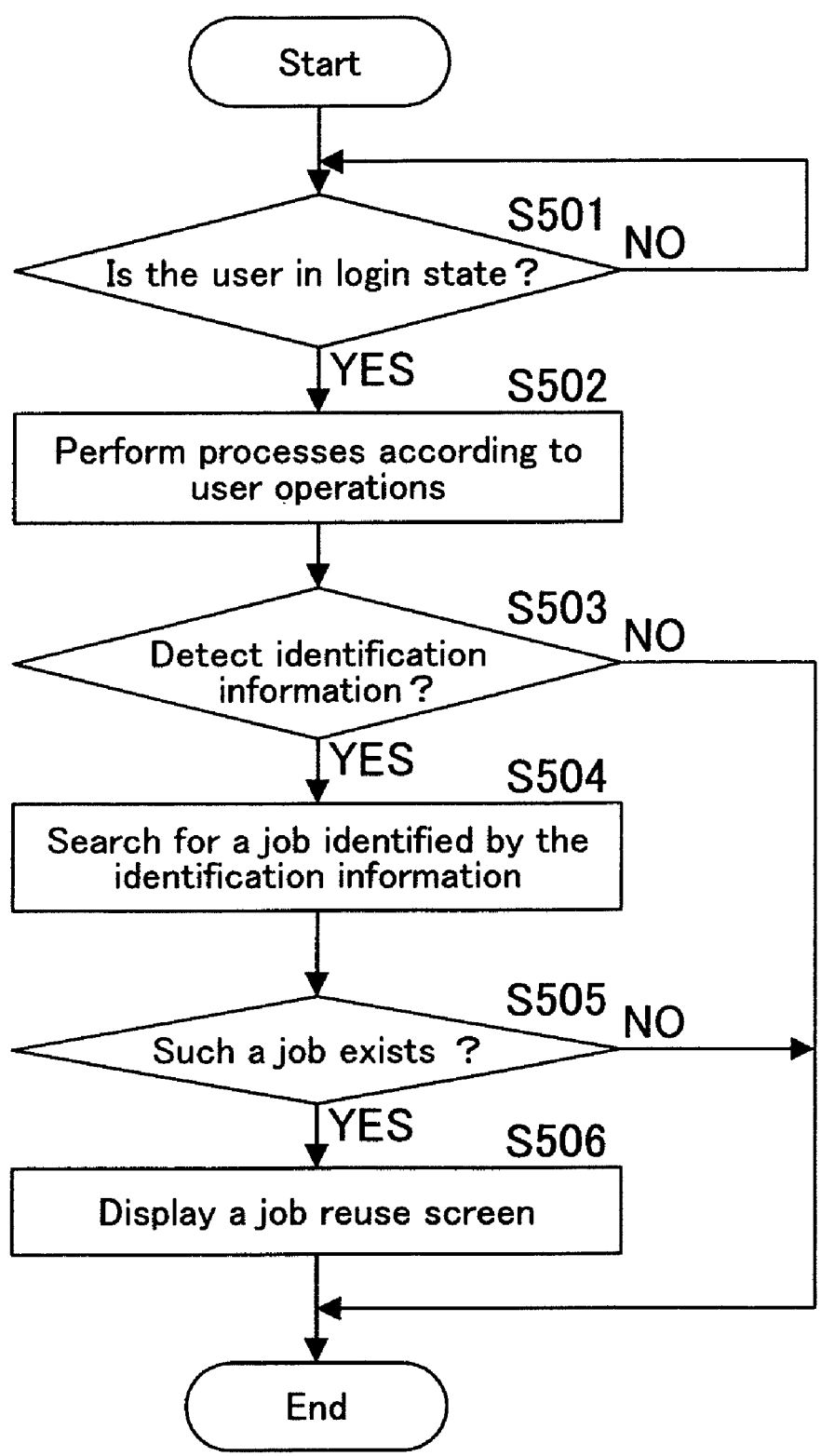
FIG. 12 is a flowchart representing a process routine that is executed in the image processing apparatus to reuse a job.

FIG. 12 is a flowchart representing a process routine that is executed in the image processing apparatus 2 to reuse a job, in the second embodiment. This process routine is also executed by the CPU 10 according to a program stored in a recording medium such as the ROM 11 or the memory 13.

Initially, a user performs an operation. Then in Step S501, the user authenticator 31 of the image processing apparatus 2 executes its functions, that is, it judges whether or not the user is in login state.

If the user enters a user ID and a password and is authenticated thereby (YES in Step S501), then in Step S502, the following various user operations are accepted and the job administrator 35 and the job executor 33 execute their functions, that is, perform processes according to the user operations.

When the user gives an instruction to read a document by the scanner 22, a document is scanned. Then, it is judged in Step S503, whether or not identification information to identify a job is detected from the document. If such identification information is not detected (NO in Step S503), the routine terminates.

When the user gives an instruction to read a document holding identification information, for example a job number to identify a job, which is printed thereon, the image processing apparatus 2 reads this document and extracts such identification information therefrom (YES in Step S503). Since the method for extracting from readout image data, identification information preliminarily given to the image data as a ground pattern or an electronic watermark, is heretofore known, for example by Japanese Unexamined Laid-open Patent Publication No. 2004-343780, explanation thereof will be omitted.

In Step S504, the job specifier 35 executes its functions, that is, searches for a job identified by the extracted identification information among the plurality of jobs recorded in the memory 13. Then, it is judged in Step S505, whether or not such a job exists.

If no such job exists (NO in Step S505), the routine terminates. If such a job exists (YES in Step S505), the job reuse screen G3 (shown in FIG. 10) to reuse the job is displayed on the display 25, in Step S506.

As described above, in this embodiment, when executes a job (print job) received via the network 6, the job executor 33 of the image processing apparatus 2 prints out image data originated from data included in the job, together with identification information to identify the job. In order to reuse that job, users simply gives an instruction to read a document (paper) obtained by executing the job, by the scanner 22.

If image data read out and obtained from a document by the scanner 22 includes identification information, the job specifier 35 specifies one job that is identified by the identification information, among a plurality of jobs recorded in the memory 13. This would relieve users of the bother of selecting a target job to reuse, among many jobs. And thus, even if many jobs are recorded in the image processing apparatus 2, users' operation loads are now reduced and users can effectively reuse a job. And furthermore, even if users forget a storage location of base data, they can easily check it.

Described above are some preferred embodiments of the present invention. However, the present invention is not limited to these embodiments. For example, a target job to be reused is primarily a print job in these embodiments, but is not necessarily limited to a print job. Specifically, in the first embodiment, a job other than a print job, for example a facsimile transmission request job to request the image processing apparatus 2 to transmit a facsimile to an address.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system including an image processing apparatus and an information processing apparatus interconnected via a network, wherein:
the information processing apparatus comprises:
an accepter that accepts a user's specified data and requested job to be executed on the specified data;
a storage location information generator that generates storage location information indicating a storage location at which of the specified data is stored; and a transmitter that transmits to the image processing apparatus, the job including the specified data accepted by the acceptor and the storage location information generated by the storage location information generator, collectively, and the image processing apparatus comprises:

a receiver that receives the job and the storage location information; and a memory that records in itself, the job and the storage location information received by the receiver, with interconnections between them.

2. The image processing system recited in claim 1, wherein:

the transmitter of the information processing apparatus transmits to the image processing apparatus, user information indicating a user who requested the job, together with the job;

the memory of the image processing apparatus records in itself, the job, the storage location information and the user information received by the receiver, with interconnections between them; and the image processing apparatus further comprises:

an authenticator that authenticates a user;

an extractor that extracts jobs connected to the user authenticated by the authenticator, from a plurality of jobs recorded in the memory, based on the user information pieces recorded with connections to the respective jobs; and a display that displays the extracted jobs in the folder tree-view based on the storage locations indicated by the storage location information, to which the specified data is assigned when the jobs are accepted by the accepter of the information processing apparatus.

3. The image processing system recited in claim 1, wherein:

the image processing apparatus further comprises:

an accepter that accepts a job selected by the user among those recorded in the memory; and a job executor that executes the job accepted by the accepter.

4. The image processing system recited in claim 1, wherein:

the memory of the image processing apparatus further records in itself, time and date information indicating a time and date that the receiver receives the job at; and the display displays on itself, the job together with the time and date information.

5. The image processing system recited in claim 3, wherein:

the job executor corresponds to a printer; and when the printer executes the job, the printer prints out on paper, print data of the job and identification information to identify the job.

6. The image processing system recited in claim 1, wherein:

the job corresponds to a print job, and the image processing apparatus further comprises:

a reader that reads a document holding print data and identification information to identify the job, printed thereon;

an extractor that extracts the identification information from image data read out from the document by the reader;

a judger that judges whether or not the job identified by the identification information extracted by the extractor, exists among the jobs recorded in the memory; and a display that displays on itself, the job identified by the identification information if the judger judges that the job exists.

7. An image processing method implemented by an image processing system including an image processing apparatus and an information processing apparatus interconnected via a network, comprising:

the information processing apparatus's:

accepting a user's specified data and requested job to be executed on the specified data;

generating storage location information indicating a storage location at which of the specified data is stored; and transmitting to the image processing apparatus, the accepted job including the specified data and the generated storage location information of the data, collectively, and the image processing apparatus's:

receiving the job and the storage location information; and recording in a memory, the received job and storage location information, with interconnections between them.

8. The image processing method recited in claim 7, wherein:

the information processing apparatus transmits the job to the image processing apparatus, together with user information indicating the user who requested the job; and the image processing apparatus records the job, the storage location information and the received user information, with interconnections between them, and further comprising the image processing apparatus's:

authenticating a user;

extracting jobs connected to the authenticated user from a plurality of jobs recorded in the memory, based on the user information pieces recorded with connections to the respective jobs; and displaying on a display, the extracted jobs in the folder tree-view based on the storage locations indicated by the storage location information, to which the specified data is assigned when the jobs are accepted by the accepter of the information processing apparatus.

9. The image processing method recited in claim 7, further comprising the image processing apparatus's:

accepting a job selected by the user among those recorded in the memory; and executing the accepted job.

10. The image processing method recited in claim 7, wherein:

the image processing apparatus further records time and date information indicating a time and date that it receives the job at; and the image processing apparatus displays the job together with the time and date information.

11. The image processing method recited in claim 9, wherein:

the image processing apparatus's executing the job corresponds to printing; and when the image processing apparatus executes the job, the image processing apparatus prints out on paper, print data of the job and identification information to identify the job, together.

12. The image processing method recited in claim 7, wherein:

the job corresponds to a print job, and further comprising the image processing apparatus's:

reading a document holding print data and identification information to identify the job, printed thereon;

extracting the identification information from image data obtained from the document;

judging whether or not the job identified by the extracted identification information, exists among the jobs recorded in the memory; and displaying on a display, the job identified by the identification information if it is judged that the job exists.

13. An image processing apparatus comprising:
a receiver that receives a job including base data and storage location information indicating a storage location at which the of base data is stored of data included in the job, which are collectively transmitted by an information processing apparatus, via a network; and
a memory that records in itself, the job and the storage location information received by the receiver, with interconnections between them.

14. The image processing apparatus recited in claim 13, wherein:
the receiver further receives user information indicating a user who requested the job, transmitted together with the job; and
the memory further records in itself, the job, the storage location information and the user information received by the receiver, with interconnections between them, and further comprising:
an authenticator that authenticates a user;
an extractor that extracts jobs connected to the user authenticated by the authenticator, from a plurality of jobs recorded in the memory, based on the user information pieces recorded with connections to the respective jobs; and
a display that displays the extracted jobs in the folder tree-view based on the storage locations indicated by the storage location information, to which the specified data is assigned when the jobs are accepted by the accepter of the information processing apparatus.

15. The image processing apparatus recited in claim 13, further comprising:
an accepter that accepts a job selected by a user among those recorded in the memory; and
a job executor that executes the job accepted by the accepter.

16. The image processing apparatus recited in claim 13, wherein:
the memory further records in itself, time and date information indicating a time and date that the receiver receives the job at; and
the display displays on itself, the job together with the time and date information.

17. The image processing apparatus recited in claim 15, wherein:
the job executor corresponds to a printer; and
when the printer executes the job, the printer prints out on paper, print data of the job and identification information to identify the job, together.

18. The image processing apparatus recited in claim 13, wherein:
the job corresponds to a print job, and
further comprising:
a reader that reads a document holding print data and identification information to identify the job, printed thereon;
an extractor that extracts the identification information from image data read out from the document by the reader;
a judger that judges whether or not the job identified by the identification information extracted by the extractor, exists among the jobs recorded in the memory; and
a display that displays on itself, the job identified by the identification information if the judger judges that the job exists.

19. A non-transitory computer readable recording medium having an image processing program recorded therein to make a computer of an image processing apparatus execute:
receiving a job including base data and storage location information indicating a storage location at which the of base data is stored of data included in the job, which are collectively transmitted by an information processing apparatus, via a network; and
recording in a memory, the received job and storage location information, with interconnections between them.

20. The non-transitory computer readable recording medium recited in claim 19, wherein:
user information indicating a user who requested the job, transmitted together with the job, is further received; and
the received user information, the job, the storage location information and the received user information are recorded with interconnections between them, and
which image processing program is recorded therein to make the computer further execute:
authenticating a user;
extracting jobs connected to the authenticated user from a plurality of jobs recorded in the memory, based on the user information pieces recorded with connections to the respective jobs; and
displaying on a display, the extracted jobs in the folder tree-view based on the storage locations indicated by the storage location information, to which the specified data is assigned when the jobs are accepted by the accepter of the information processing apparatus.

21. The non-transitory computer readable recording medium recited in claim 19, which image processing program is recorded therein to make the computer further execute:
accepting a job selected by a user among those recorded in the memory; and
executing the accepted job.

22. The non-transitory computer readable recording medium recited in claim 19, wherein:
time and date information indicating a time and date that the receiver receives the job at, is recorded; and
the job is displayed together with the time and date information.

23. The non-transitory computer readable recording medium recited in claim 21, wherein:
executing the job corresponds to printing; and
when the job is executed, print data of the job and identification information to identify the job are printed out on paper together.

24. The non-transitory computer readable recording medium recited in claim 19, wherein:
the job corresponds to a print job, and
which image processing program is recorded therein to make the computer further execute:
reading a document holding print data and identification information to identify the job, printed thereon;
extracting the identification information from image data obtained from the document;
judging whether or not the job identified by the extracted identification information, exists among the jobs recorded in the memory; and
displaying on a display, the job identified by the identification information if it is judged that the job exists.

25. An information processing apparatus comprising:
an accepter that accepts a user's specified data and requested job to be executed on the specified data;

a storage location information generator that generates storage location information indicating a storage location at which of the specified data is stored; and a transmitter that transmits to an image processing apparatus, the job including the specified data accepted by the acceptor and the storage location information generated by the storage location information generator, collectively, via a network.

26. A non-transitory computer readable recording medium having an image processing program recorded therein to make a computer of an information processing apparatus execute:

accepting a user's specified data and requested job to be executed on the specified data;

generating storage location information indicating a storage location at which of the specified data is stored; and transmitting to an image processing apparatus, the accepted job including the specified data and the generated storage location information, collectively, via a network.

* * * * *